(12) United States Patent
Wuellner et al.

(10) Patent No.: US 9,392,064 B2
(45) Date of Patent: Jul. 12, 2016

(54) PROVIDING TO A WEB-BASED APPLICATION ACCESS AT A HARDWARE LEVEL TO A PERIPHERAL DEVICE

(75) Inventors: Trond Thomas Wuellner, Mountain View, CA (US); Scott James Remnant, San Francisco, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 13/533,929

(22) Filed: Jun. 26, 2012

(65) Prior Publication Data

US 2015/0207884 A1    Jul. 23, 2015

(51) Int. Cl.
*G06F 13/42* (2006.01)
*H04L 29/08* (2006.01)
*H04L 29/06* (2006.01)

(52) U.S. Cl.
CPC ............ *H04L 67/141* (2013.01); *H04L 67/02* (2013.01); *H04L 69/14* (2013.01)

(58) Field of Classification Search
CPC .............................. H04L 67/141; H04L 67/02
USPC ............................................... 710/62; 463/42
See application file for complete search history.

(56) References Cited

U.S. PATENT DOCUMENTS

| | | | |
|---|---|---|---|
| 6,665,731 B1 | 12/2003 | Kumar et al. | |
| 2001/0034754 A1 | 10/2001 | Elwahab et al. | |
| 2008/0046714 A1* | 2/2008 | Suganthi et al. | 713/150 |
| 2009/0106456 A1* | 4/2009 | Muller et al. | 710/5 |
| 2011/0055892 A1* | 3/2011 | Wang et al. | 726/3 |
| 2011/0240736 A1 | 10/2011 | Miyachi et al. | |
| 2012/0042016 A1* | 2/2012 | Kroeger et al. | 709/206 |
| 2012/0169593 A1* | 7/2012 | Mak et al. | 345/157 |
| 2013/0060905 A1* | 3/2013 | Mickens et al. | 709/219 |
| 2013/0132510 A1* | 5/2013 | Ye et al. | 709/217 |

OTHER PUBLICATIONS

Using a mobile device to control a game on your browser (https://www.webdigi.co.uk/blog/2012/using-an-ios-device-to-control-a-game-on-your-browser/); Mar. 2012.*
"Chai 3D-Concept" retrieved from <http://www.chai3d.org/concept2.html> 2009, 2 pgs.
Meredith, Leslie, "Microsoft Revives the Mouse | TechNewsDaily.com" retrieved from <http://www.technewsdaily.com/1054-microsoft-revives-the-mouse.html> Sep. 1, 2010, 4 pgs.
"H3D API Manual—for Version 2.1", SenseGraphics AB, Sep. 4, 2009, 57 pgs.
"OpenHaptics Toolkit—Sensable" retrieved on Jun. 25, 2012 from <http://www.sensable.com/products-openhaptics-toolkit.htm> 2 pgs.

* cited by examiner

*Primary Examiner* — Henry Tsai
*Assistant Examiner* — John Roche
(74) *Attorney, Agent, or Firm* — McDermott Will & Emery LLP

(57) ABSTRACT

The disclosed subject matter relates to computer implemented methods for providing to a web-based application access at a hardware level to a peripheral device. In one aspect, a method includes establishing a first link between a computing device and a web-based application. The computing device is configured to access the web-based application. The method further includes establishing a second link between the computing device and a peripheral device. The method further includes bridging the first link and the second link to establish a communication channel between the web-based application and the peripheral device. The communication channel is configured to provide to the web-based application access at a hardware level to the peripheral device.

19 Claims, 5 Drawing Sheets

PROVIDING TO A WEB-BASED APPLICATION ACCESS AT A HARDWARE LEVEL TO A PERIPHERAL DEVICE

BACKGROUND

A web-based application is typically accessed over a network such as the Internet, or an intranet. The term is also used to refer to software applications that are written in browser-supported languages. One example of a browser-supported language is JavaScript. Browser-supported languages (e.g., JavaScript) can be combined with browser-rendered markup language (e.g., HTML) to render an application executable.

SUMMARY

The disclosed subject matter relates to a computer-implemented method for providing to a web-based application access at a hardware level to a peripheral device. The method includes establishing a first link between a computing device and a web-based application. The computing device is configured to access the web-based application. The method further includes establishing a second link between the computing device and a peripheral device. The method further includes bridging the first link and the second link to establish a communication channel between the web-based application and the peripheral device. The communication channel is configured to provide to the web-based application access at a hardware level to the peripheral device.

The disclosed subject matter further relates to a system for providing to a web-based application access at a hardware level to a peripheral device. The system includes a memory which includes instructions for providing to a web-based application access at a hardware level to a peripheral device, and a processor. The processor is configured to execute the instructions to provide to a web-based application access at a hardware level to a peripheral device. The processor is further configured to establish a first link between a computing device between a computing device and a web-based application. The processor is further configured to establish a second link between the computing device and a peripheral device. The processor is further configured to bridge the first link and the second link to establish a communication channel between the web-based application and the peripheral device. The communication channel is configured to provide to the web-based application access at a hardware level to the peripheral device. The communication channel is further configured for bi-directional hardware level communication between the web-based application and the peripheral device.

The disclosed subject matter further relates to a machine-readable medium including machine-readable instructions for causing a processor to execute a method for providing to a web-based application access at a hardware level to a peripheral device. The method includes establishing a first link between a computing device and a web-based application. The computing device is configured to access the web-based application. The method further includes establishing a second link between the computing device and a peripheral device. The method further includes bridging the first link and the second link to establish a communication channel between the web-based application and the peripheral device. The communication channel is configured to provide to the web-based application access at a hardware level to the peripheral device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Access to peripheral devices may be granted to an application for a variety of reasons. Access to peripheral devices requires a level of access privileges that can include access to other resources (e.g., hard disk, files) on a computing device. Providing access privileges at such a level to a web-based application may pose a security threat.

According to certain aspects of the subject technology, systems and methods for providing to a web-based application access at a hardware level to a peripheral device are provided. The phrase "access at a hardware level" as used herein encompasses its plain and ordinary meaning, including, but not limited to access to a device with little or no abstraction.

Figure 1:
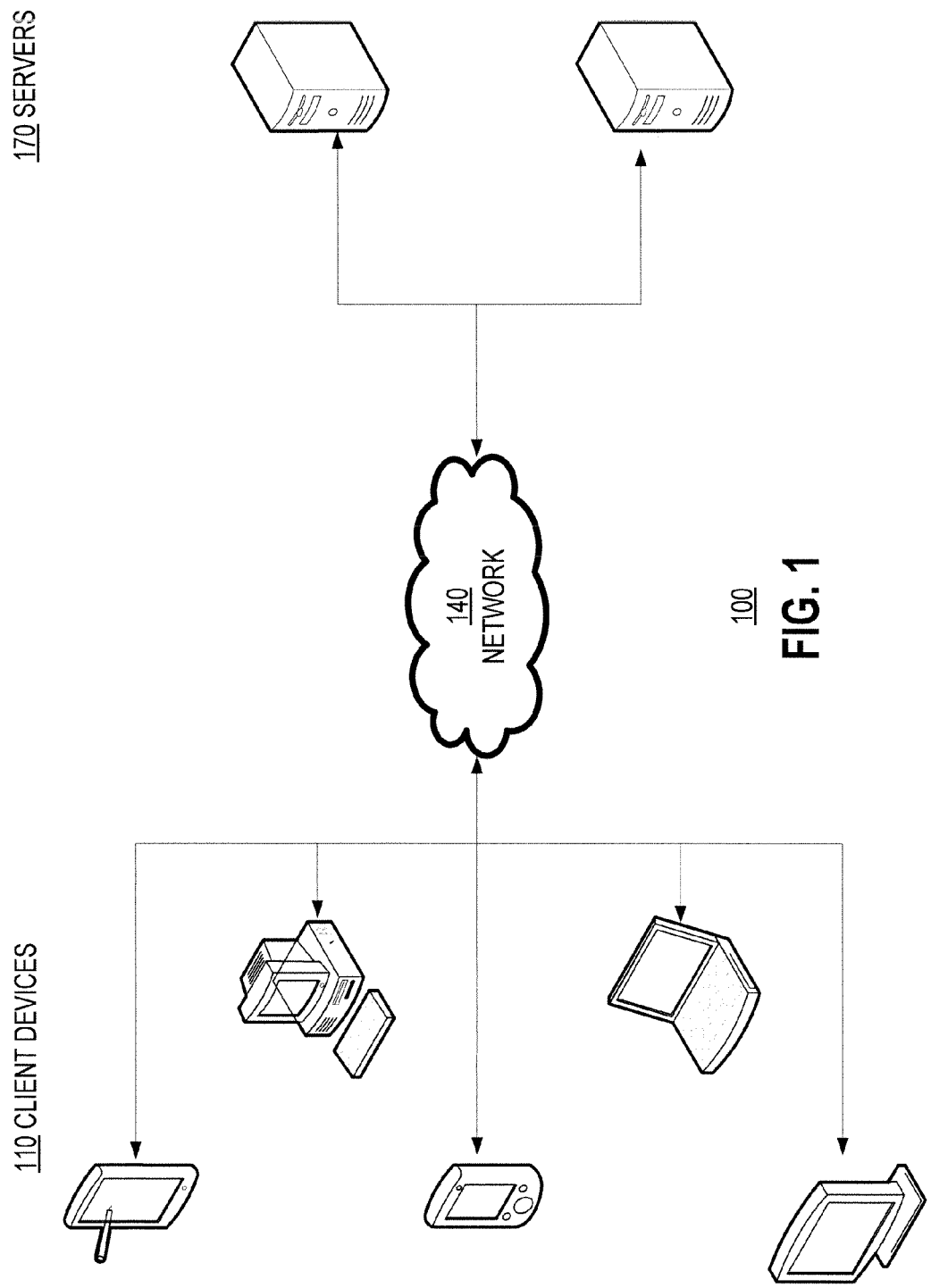
FIG. 1 illustrates an example of an architecture for providing to a web-based application access at a hardware level to a peripheral device.

FIG. 1 illustrates an example of an architecture 100 for providing to a web-based application access at a hardware level to a peripheral device. The architecture 100 includes computing devices 110 and servers 170 connected over a network 140.

The computing devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory. Each computing device 110 is configured to include an input device for accepting user input, and an output device to display information to the user.

Each computing device 110 can have connected to it, one or more peripheral devices. The term "peripheral device" as used herein encompasses its plain and ordinary meaning, including, but not devices that are operatively linked to a computing device (e.g., computing device 110). A peripheral device can be an input device, an output device, and/or a second computing device 110.

The computing devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

Figure 2:
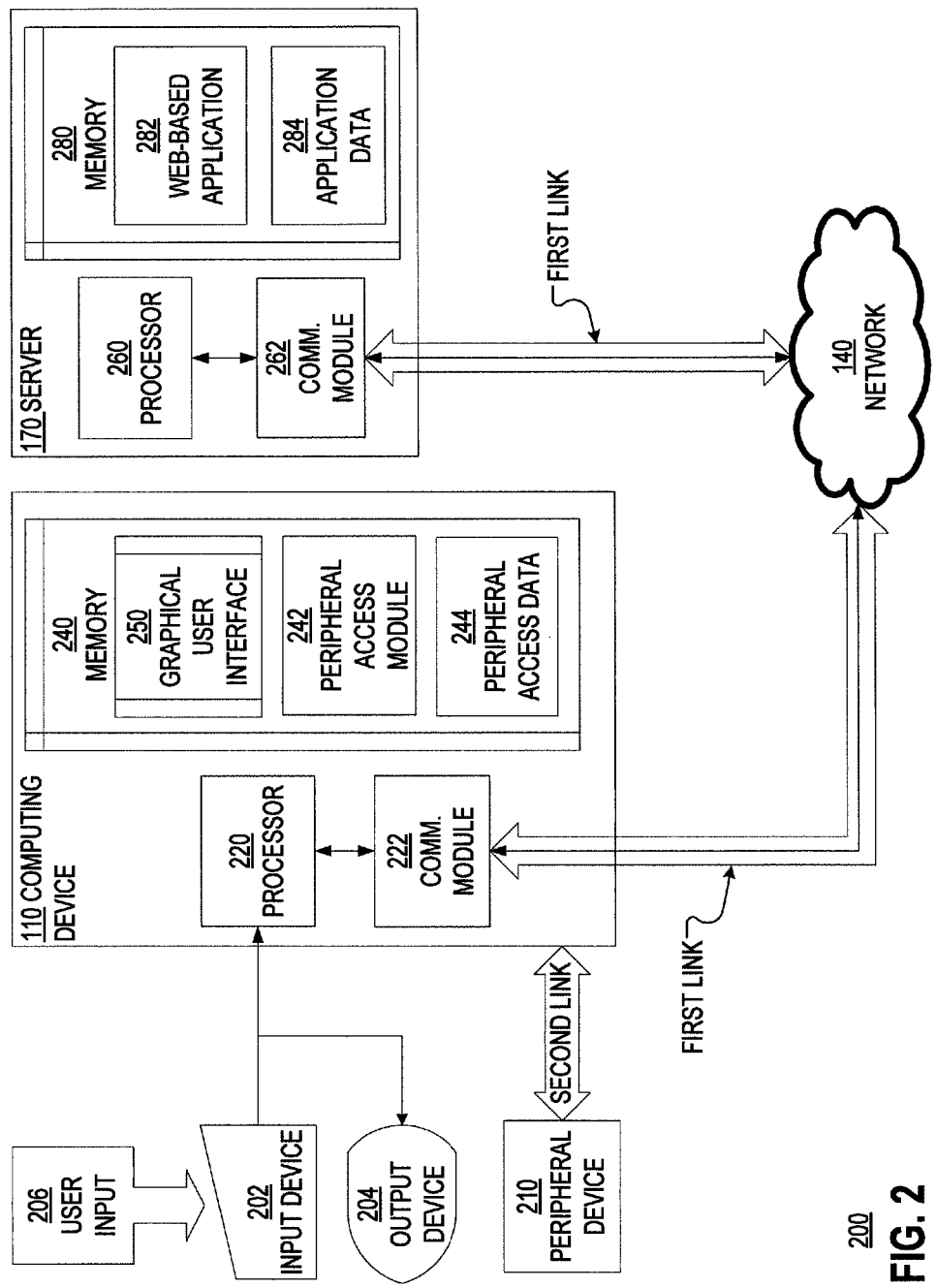
FIG. 2 is a block diagram illustrating an example of a computing device and a server from the architecture of FIG. 1.

FIG. 2 is a block diagram 200 illustrating an example of a computing device 110 and a server 170 in the architecture 100 of FIG. 1 according to certain aspects of the disclosure.

The computing device 110 includes an input device 202, an output device 204, a processor 220, a communications module 222, and memory 240. The input device 202 can be a touchscreen, a mouse, a keyboard, or any other device to enable a user to supply input 206 to the computing device 110. The output device 204 can be a display screen. Input 206 received via the input device 202 can be processed locally on the computing device 110 and/or the server 170.

The computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which allows a user to interact with the computing device 110, and can be used to display information to the user. The graphical user interface 250 may be installed locally at the computing device 110 and/or downloaded from the server 170.

The memory 240 further includes software instructions that can be read by the processor 220 to implement a peripheral access module 242. Data generated and/or stored by the peripheral access module 242 can be stored as peripheral access data 244. The peripheral access module 242 includes software instructions for establishing a first link between the computing device 110, and a web-based application which can be displayed on the computing device as, or within the graphical user interface 250. The peripheral access module 242 further includes software instructions for establishing a second link between the computing device and the peripheral device 210. The peripheral access module 242 further includes software instructions for bridging the first link and the second link to establish a communication channel between the web-based application and the peripheral device 210. The communication channel is configured to provide to the web-based application access at a hardware level to the peripheral device 210.

A peripheral device 210 is operatively linked to the computing device 110. The peripheral device 210 can be an input device 202, an output device 204, and/or a second computing device 110. The first link and/or the second link can be wired or wireless.

The processor 220 of the computing device 110 is configured to execute instructions, such as instructions physically coded into the processor 220, instructions read from the memory 240, or a combination of both. As an example, based on the instructions read from the memory 240 (e.g., the peripheral access module 242), the processor 220 can be configured to execute a method for providing to a web-based application access at a hardware level to a peripheral device 210.

Once the instructions from the memory 240 are loaded, the processor 220 is configured to establish a first link between a computing device (e.g., 110) and a web-based application, wherein the computing device (e.g., 110) is configured to access the web-based application. The processor 220 is further configured to establish a second link between the computing device (e.g., 110) and a peripheral device (e.g., 210). The processor 220 is further configured to bridge the first link and the second link to establish a communication channel between the web-based application and the peripheral device (e.g., 210), wherein the communication channel is configured to provide to the web-based application access at a hardware level to the peripheral device (e.g., 210).

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

One or more of the servers 170 can host the web-based application 282 being accessed by the computing device 110. Data generated and/or stored by the web-based application 282 can be stored as application data 284.

Figure 3:
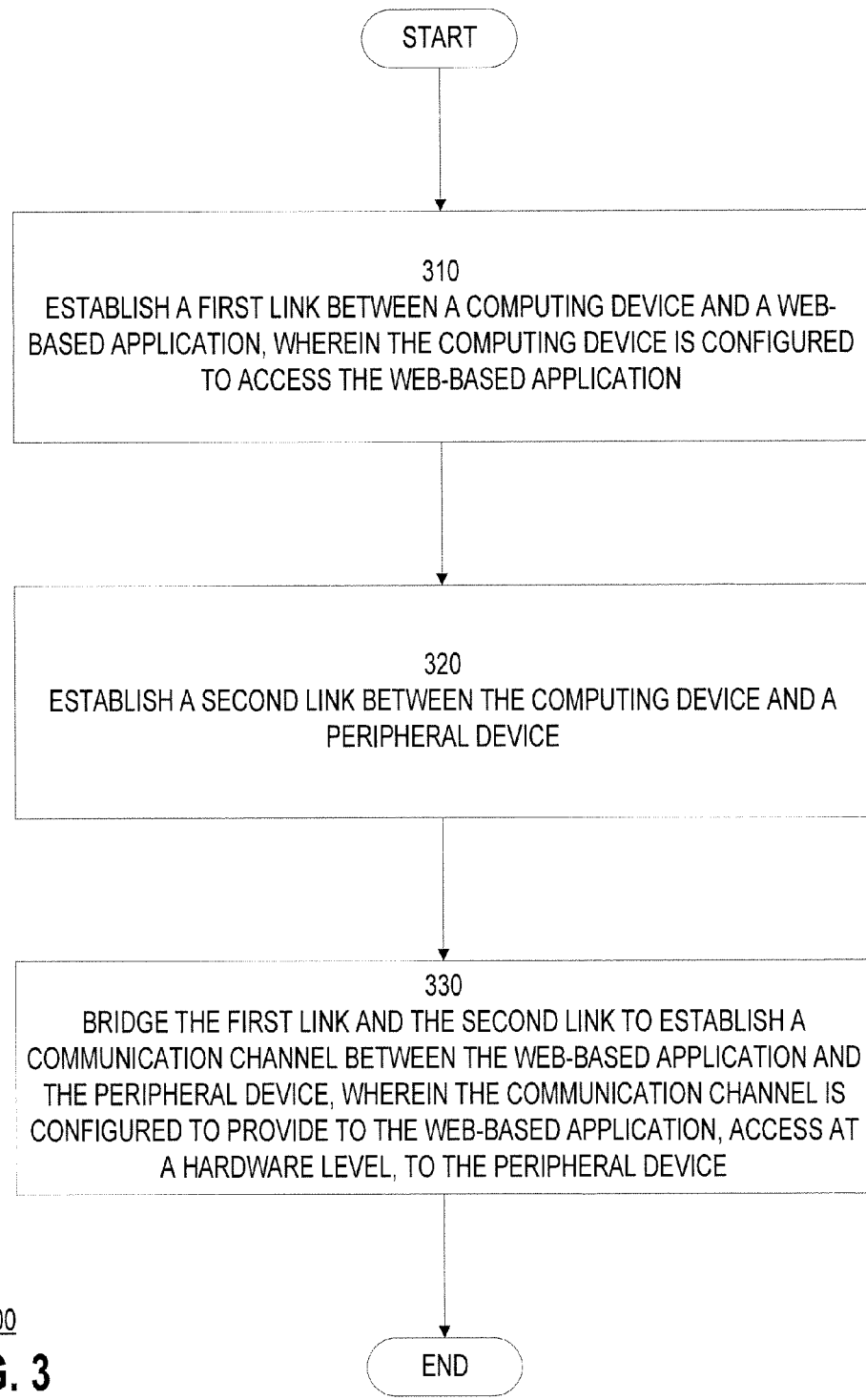
FIG. 3 illustrates an example of a process for providing to a web-based application access at a hardware level to a peripheral device.

FIG. 3 illustrates an example of a process 300 for providing to a web-based application access at a hardware level to a peripheral device. It should be noted that although process 300 is described herein with reference to the systems of FIGS. 1 and 2, process 300 is not limited to such, and can be performed by other systems and/or configurations.

In step 310, a first link is established between the computing device 110 and the web-based application 282. The computing device 110 is configured to access the web-based application 282. The web-based application 282 is displayed on the output device 204 as, or within the graphical user interface 250.

In step 320, a second link is established between the computing device 110 and a peripheral device 210. The peripheral device 210 can be operatively linked to the computing device 110 wirelessly or using a wire. That is, the second link, which is the link between the computing device 110 and the peripheral device 210, can be wired or wireless.

In step 330, the first link and the second link are bridged to establish a communication channel between the web-based application 282 and the peripheral device 210.

The first link and the second link can be bridged in a variety of ways. For example, the bridging can include a handshake to establish the communication channel. The handshake can be a secure handshake. That is, the handshake can be implemented in a manner to prevent eavesdropping and/or tampering with the handshake. Therefore, when the handshake is a secure handshake, an entity (e.g., a malicious program operating on the computing device 110, a third party) can not learn anything about the contents of the handshake.

Just as the handshake can be implemented as a secure handshake, the communication channel can similarly be secured. That is, the communication channel can be implemented in a manner that prevents eavesdropping and/or tampering with the communications channel.

The communication channel can support bi-directional communication between the web-based application 282 and the peripheral device 210. That is, both the web-based application 282 and the peripheral device 210 can send data to and/or receive data from each other at a hardware level.

As one example, the communication channel can enable the web-based application 282 to access features of the peripheral device 210 without intermediary translation (e.g., abstraction) by software (e.g., operating system) installed on the computing device 110. Similarly, the communication channel is configured to carry information (e.g., signals, data) from the peripheral device 210 to the web-based application 282 without intermediary translation by software (e.g., operating system) installed on the computing device 110.

As another example, the peripheral device 210 can send raw data to the web-based application 282 via the communication channel. Similarly, the web-based application 282 can send data and/or instructions to the peripheral device 210. The data and/or instructions sent by the web-based application 282 can be in response to the raw data received from the peripheral device 210.

It should be noted that the phrase "raw data" as used herein encompasses its plain and ordinary meaning, including, but not limited to unprocessed data generated by a peripheral device (e.g., peripheral device 210).

The communication channel is configured to limit access privileges of the web-based application 282 to the peripheral device 210. That is, the communication channel is implemented in a manner that prevents the web-based application 282 from accessing any resources on or connected to the computing device 110 other than the peripheral device 210. By restricting the access privileges of the web-based application 282, the computing device 110, and any information stored therein is protected against malicious use.

The communication channel is configured to operate in a stand-alone mode. That is, if the communication channel fails, the computing device 110 does not become non-responsive and/or perform an ungraceful exit.

The communication channel can be used for a variety of purposes. As one example, a software developer may develop an Application Programming Interface ("API") and utilize the communication channel for exchanging information via the API with a particular peripheral device 210.

Figure 4:
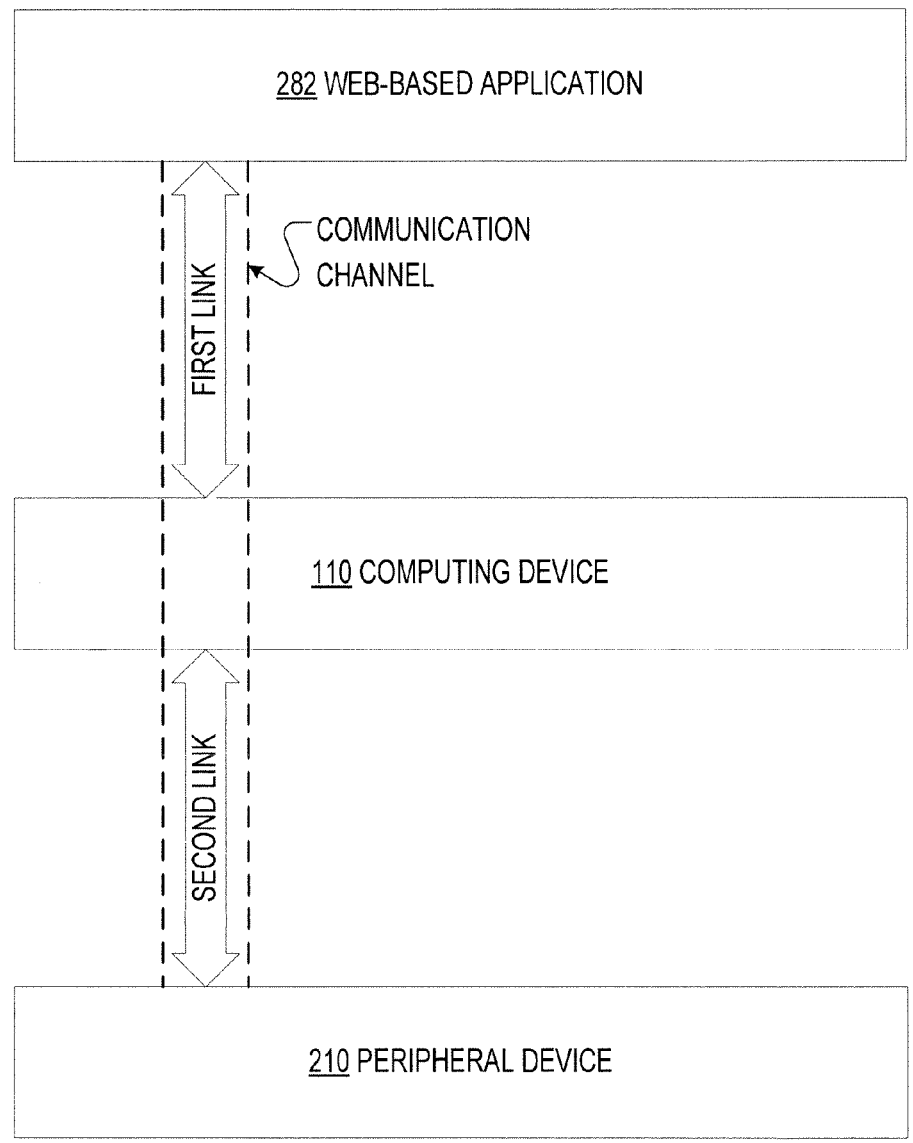
FIG. 4 is an illustration of an example of a system associated with the example of the process of FIG. 3.

An example will now be described using the example of the process 300 of FIG. 3. In this example, illustrated in FIG. 4, a desktop computer will be used as the computing device 110, an LCD monitor will be used as the output device 204, a wireless game controller will be used as a peripheral device 210, and a web-based first-person shooter ("FPS") game will be used as a web-based application 282.

In step 310, a first link is established between the desktop computer 110 and the web-based FPS game 282. The first link is established when the desktop computer 110 connects, via a network 140, to a server 170 which provides access to the web-based FPS game 282.

In step 320, a second link is established between the desktop computer 110 and the wireless game controller 210. Because the game controller is wireless, the second link is a wireless link. In this example, the second link is based on Bluetooth technology. That is, the wireless game controller 210 and the desktop computer 110 communicate with each other via a Bluetooth link.

In step 330, the first link and the second link are bridged to establish a communication channel between the web-based FPS game 282 and the wireless game controller 210. Once the communication channel is established, the web-based FPS game 282 and the wireless game controller 210 can exchange information with each other.

In this example, the web-based FPS game 282 queries the wireless game controller 210 to obtain a feature set of the wireless game controller 210. The web-based FPS game 282 determines that the wireless game controller 210 includes buttons which can be used as a trigger to shoot a weapon within the web-based FPS game 282, and motors which can be used to provide feedback (e.g., recoil when discharging a weapon).

The user playing the web-based FPS game 282 can travel through a virtual world, and shoot various targets. For example, when the user playing the web-based FPS game 282 sees, on the monitor 204, a potential target, the user can press a button on the wireless game controller 210 to shoot at that potential target. When the user presses the button on the wireless game controller 210, the raw data generated is sent, via the communication channel to the web-based FPS game 282. When the button press is received by the web-based FPS game 282, the web-based FPS-game 282, sends a command to actuate a motor within the wireless game controller 210. The actuation of the motor simulates a recoil effect typically experienced when discharging a firearm. Because of the simulated recoil effect, additional realism is added to the web-based FPS game 282, which enhances the user's gaming experience.

Figure 5:
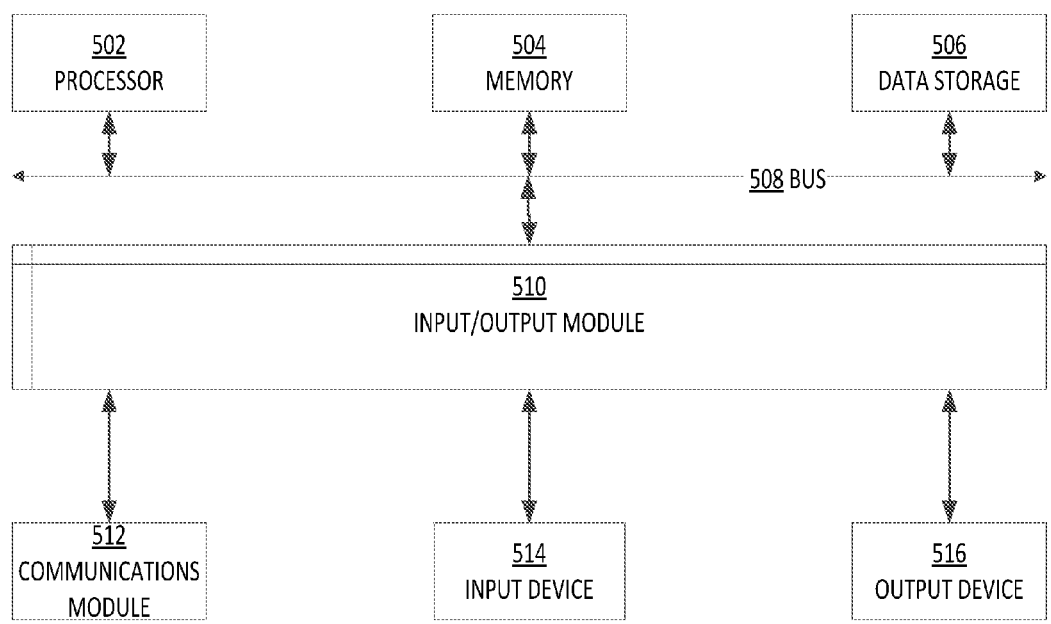
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include computing devices (e.g., client devices) and servers. A computing device (e.g., a client) and server are generally remote from each other and typically interact through a communication network. The relationship of a computing device (e.g., a client device) and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing to a web-based application access at a hardware level to a peripheral device, the method comprising:
    establishing a first link between a computing device and a server remote from the computing device, wherein the first link is established when the computing device connects to the server and provides access to a web-based application operating on the server;
    establishing a second link between the computing device and a peripheral device; and
    bridging the first link and the second link to establish a communication channel between the web-based application and the peripheral device,
    wherein the communication channel is configured to provide to the web-based application access at a hardware level to the peripheral device from the server and to provide the peripheral device and the web-based application the ability to send data to and receive data from each other through the computing device without intermediary translation by software installed on the computing device.

2. The computer-implemented method of claim 1, wherein the bridging comprises a handshake to establish the communication channel.

3. The computer-implemented method of claim 2, wherein the handshake is a secure handshake.

4. The computer-implemented method of claim 1, wherein the peripheral device is a wireless peripheral device, and wherein the second link between the computing device and the wireless peripheral device is a wireless link.

5. The computer-implemented method of claim 1, wherein the peripheral device is connected to the computing device with a wire, and wherein the second link between the computing device and the peripheral device is a wired link.

6. The computer-implemented method of claim 1, wherein the communication channel is configured to limit access privileges of the web-based application to the peripheral device.

7. The computer-implemented method of claim 1, wherein the communication channel is configured to enable the peripheral device to receive raw data from the web-based application.

8. The computer-implemented method of claim 1, wherein the communication channel is configured to enable the peripheral device to send raw data to the web-based application.

9. The computer-implemented method of claim 1, wherein the peripheral device is a second computing device.

10. A system for providing to a web-based application access at a hardware level to a peripheral device, the system comprising:
    a memory comprising instructions for providing to a web-based application access at a hardware level to a peripheral device; and
    a processor configured to execute the instructions to:
        establish a first link between a computing device and a server remote from the computing device, wherein the first link is established when the computing device connects to the server and provides access to a web-based application operating on the server;
        establish a second link between the computing device and a peripheral device; and
        bridge the first link and the second link to establish a communication channel between the web-based application and the peripheral device, wherein the communication channel is configured to provide to the web-based application access at a hardware level to the peripheral device from the server and to provide the peripheral device and the web-based application the ability to send data to and receive data from each other through the computing device without intermediary translation by software installed on the computing device.

11. The system of claim 10, wherein the bridging comprises a handshake to establish the communication channel.

12. The system of claim 11, wherein the handshake is a secure handshake.

13. The system of claim 10, wherein the peripheral device is a wireless peripheral device, and wherein the second link between the computing device and the wireless peripheral device is a wireless link.

14. The system of claim 10, wherein the communication channel is configured to limit access privileges of the web-based application to the peripheral device.

15. The system of claim 10, wherein the peripheral device is a second computing device.

16. A non-transitory machine-readable storage medium comprising machine-readable instructions for causing a processor to execute a method for providing a web-based application access at a hardware level to a peripheral device, the method comprising:
   establishing a first link between a computing device and a server remote from the computing device, wherein the first link is established when the computing device connects to the server and provides access to a web-based application operating on the server;
   establishing a second link between the computing device and a peripheral device; and
   bridging the first link and the second link to establish a communication channel between the web-based application and the peripheral device, wherein the communication channel is configured to provide to the web-based application access at a hardware level to the peripheral device from the server and to provide the peripheral device and the web-based application the ability to send data to and receive data from each other through the computing device without intermediary translation by software installed on the computing device.

17. The machine-readable storage medium of claim 16, wherein the peripheral device is a wireless peripheral device, and second link between the computing device and the wireless peripheral device is a wireless link.

18. The machine-readable storage medium of claim 16, wherein the communication channel is configured to limit access privileges of the web-based application to the peripheral device.

19. The machine-readable storage medium of claim 16, wherein the second peripheral device is a second computing device.

* * * * *